(12) United States Patent
Berger et al.

(10) Patent No.: US 7,137,495 B2
(45) Date of Patent: Nov. 21, 2006

(54) DRIVETRAIN

(75) Inventors: Reinhard Berger, Bühl (DE); Burkhard Pollak, Bühl (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 0 days.

(21) Appl. No.: 10/791,123

(22) Filed: Mar. 2, 2004

(65) Prior Publication Data
US 2004/0231943 A1    Nov. 25, 2004

(30) Foreign Application Priority Data
Mar. 3, 2003    (DE) ................ 103 09 065

(51) Int. Cl.
*B60W 10/02*    (2006.01)
(52) U.S. Cl. ............... 192/3.58; 192/87.13
(58) Field of Classification Search ........... 192/3.57, 192/3.58, 3.61, 3.62, 3.63, 87.13, 87.18, 192/109 D, 109 F, 83; 60/570, 582, 584
See application file for complete search history.

(56) References Cited

U.S. PATENT DOCUMENTS

| | | | | |
|---|---|---|---|---|
| 2,758,686 A | | 8/1956 | Rabe | |
| 3,352,392 A | * | 11/1967 | Black et al. | 192/3.57 |
| 3,459,285 A | * | 8/1969 | Abbott et al. | 192/3.57 |
| 4,632,234 A | * | 12/1986 | Bardoll et al. | 192/3.58 |
| 4,671,394 A | * | 6/1987 | Braun | 192/3.57 |
| 5,273,143 A | * | 12/1993 | Voss et al. | 192/3.58 |
| 5,711,409 A | * | 1/1998 | Murata | 192/87.11 |
| 5,906,256 A | * | 5/1999 | Hayashi et al. | 192/83 |
| 6,098,772 A | * | 8/2000 | Kimmig et al. | 192/70.25 |
| 6,234,290 B1 | * | 5/2001 | Drexl et al. | 192/85 CA |
| 2003/0051964 A1 | * | 3/2003 | Hirt et al. | 192/48.7 |

FOREIGN PATENT DOCUMENTS

| | | |
|---|---|---|
| DE | 3206740 | 9/1983 |
| DE | 19522477 | 1/1997 |
| EP | 0383731 | 8/1990 |

* cited by examiner

*Primary Examiner*—Rodney H. Bonck
(74) *Attorney, Agent, or Firm*—Simpson & Simpson, PLLC

(57) ABSTRACT

The invention relates to a drivetrain comprising an internal combustion engine, at least one friction clutch having at least one disengagement device with a pressure relief device and a transmission.

20 Claims, 3 Drawing Sheets

DRIVETRAIN

CROSS REFERENCE TO RELATED APPLICATIONS

This patent claims priority of German Patent Application No. 103 09 065.7, filed Mar. 3, 2003, which application is incorporated herein by reference.

BACKGROUND OF THE INVENTION

The invention relates to a drivetrain comprising a friction clutch disposed within the frictional connection between an internal combustion engine and a transmission and having an input part connected to the internal combustion engine and at least one output part connected to a transmission input shaft, as well as a disengagement device for the latter.

In a known way, friction clutches are operated via a hydraulic disengagement system comprising a manually or automatically operated master cylinder and a slave cylinder that disengages the clutch, both cylinders being connected by a hydraulic line. In so-called forced-compression clutches, the clutch is disengaged in the force-free state of the clutch, and the frictional engagement for connecting internal combustion engine and transmission is accomplished by actuation and holding of the slave cylinder under pressure via the master cylinder. In particular for dual clutches in which a common input part is branched into two output parts, each having a transmission output shaft, the connection of the clutches in this manner is advantageous. If both or one of the two disengagement devices fails, for example by loss of pressure medium, these clutches are always open and do not lock the transmission, as is the case for clutches, for example, that are normally engaged in the force-free state.

Friction clutches of the type mentioned above are usually used, in addition to manually operated transmissions, in automated transmissions, for example in automated shift transmissions (AST) or dual clutch transmissions (DCT), which are generally driven by a control device, both the clutch and the engagement and disengagement of the gears being operated automatically. If a control device of this type fails, it may happen, depending on the control strategy used, that the clutch position of one clutch or, in a dual clutch transmission, of both clutches is/are frozen, and therefore the operation of the internal combustion engine can no longer be controlled, regardless of the transmission output speed, and thus the wheel speed is no longer controllable; that is, when the vehicle is at a standstill, for example, operation of the internal combustion engine to provide power to accessory units is no longer possible.

OBJECTS OF THE INVENTION

The object of the present invention is therefore to propose a drivetrain that, in the event of a failure of the transmission control, enables disconnection of a clutch that no longer disengages. The implementation of this objective should be simple, cost-effective, and uncomplicated in terms of assembly. As few new parts as possible should be required. Moreover, it should be avoided that when there is a failure of the transmission control, the driver has to undertake unusual operations in order to maintain undisturbed driving performance.

SUMMARY OF THE INVENTION

The objective is achieved by a drivetrain comprising a friction clutch in the power flow between an internal combustion engine and a transmission having an input part, at least one decoupling output part and at least one disengagement device, the at least one output part being decoupled from the input part in the force-free state and being brought into frictional engagement with the input part via the at least one disengagement device, the at least one disengagement device being formed of a master cylinder and a slave cylinder that is in operative connection with the master cylinder via a hydraulic line, and a pressure relief device that backs off a pressure applied between the master cylinder and slave cylinder, if operated from outside, being provided in the hydraulic line between the master cylinder and the slave cylinder.

Especially advantageous, according to the inventive concept, is a changeover in dual clutch, whereby for each clutch an annular part is connected in a rotationally fixed manner to the input part is operated by a disengagement device, the output part forming a frictional engagement with the input part and at least one disengagement device having available to it the aforementioned pressure relief device. Of course both disengagement devices are advantageously provided with a pressure relief device.

The operation from outside provides in this context that in the event of a defect of the control of the transmission and the automatic clutch, the driver may exert an influence on the disengagement state of the two clutches whereby he operates an actuation device to operate the pressure relief device. It can be particularly advantageous if, in the case of a dual clutch, both pressure relief devices are operable via a single actuation device. Furthermore, it may be advantageous if the driver operates this actuation device in connection with normal activities. For example, the operation of the pressure relief device may be combined with the operation of the selection lever for selecting drive modes of the vehicle, such as selecting gears of the transmission or setting the parking brake, the operation of the pressure relief device occurring as a function of the selection lever position. For example, in the "Neutral" or "Park" selection position the pressure relief device may be operated, while, in a position for forward or reverse drive when a manual drive mode is determined in which the gears or gear ratios are shifted up or down by moving the selection lever, this does not occur.

The transmission of the signal from the actuation device to the pressure relief device can occur mechanically, for example via a Bowden cable or a linkage, hydraulically, for example via a master/slave cylinder device, or electrically (by-wire), for example via at least one switch disposed on the actuation device that is connected to a solenoid valve on the pressure relief device. Of course operative connections of this type may also be configured in combination or in another way.

In an exemplary embodiment, the pressure relief device advantageously has an input side intake from the master cylinder and an output-side discharge to the slave cylinder. Provided between them is a chamber with an ideally negligible dead volume that is expandable by means of an axially displaceable piston as a function of pressure stored in the hydraulic line. Of course the piston is sealed off from the chamber with sealing means; for example, sealing rings, such as O-rings or pistons seals as are known from master and slave cylinders, can be used. This piston is blocked in its axial displacement by a fixing device as long as the pressure relief device is not operated. In this context, the fixing device is in operative contact with the operative connection of the actuation device: for example, on the Bowden cable a pin that engages in a radial direction with respect to the piston axis may be provided that engages in the piston via movement of the Bowden cable. The piston may be fixed alternatively or additionally using other means, such as electrical means like electromagnets or piezoelectric elements.

Two pressure relief devices can advantageously be located in a housing and/or integrated in the housing of a master cylinder or slave cylinder. The integration of the pressure relief devices into a module that is comprised of an electrical actuation system, such as an electric motor or a piezoelectric element, the mechanism for conversion of the rotary movement of an electric motor into a translational movement of the master cylinder and the master cylinder can be especially advantageous, whereby the total integration of two such modules can also be advantageous for the operation of two clutches by, for example, conserving structural space and housing parts.

In another preferable embodiment, the actuation device may actuate the pressure relief device via the operative device in such a manner that it is actuated when the operative connection is de-energized; thus, according the previous manifestation, the pressure relief device enables a pressure equalization in the hydraulic line. This has the advantage, among other things, that when there is simultaneous failure of control device and actuation device, such as in a total failure of the power supply, the pressure relief device still performs its function and the clutch(es) open(s). For this purpose, an electromagnetic valve or piezoelectric element may be used that directly forms the pressure relief device in that the fluid power medium line is depressurized by movement of a sliding element or piston.

Moreover, in using an electrically powered pressure relief device, it may be advantageous to prevent the triggering of the pressure relief device when the selection lever is rapidly shifted back and forth between the "Reverse" and "Drive" drive modes, if, for example, these selection operations pass through the "Neutral" drive mode. In this case, or whenever, triggering in the "Neutral" drive mode may also be delayed. Delay times between 0.1 and 1 second have proven advantageous.

Of course the proposed volume equalization device may also be advantageous for clutches, by means of which accessory systems, such as an air conditioner compressor or an electrical machine for starting the internal combustion engine, assisted or autonomous driving of the vehicle and/or for generating electrical energy may be coupled to the drive train. In the case of a dual clutch transmission, it may be advantageous to provide an accessory system that may be decoupled from one of the two transmission input shafts and/or the crankshaft.

BRIEF DESCRIPTION OF THE DRAWINGS

The invention is explained in detail in relation to FIGS. 1 to 4.

In the drawing.

DETAILED DESCRIPTION OF THE PREFERRED EMBODIMENT

Figure 1:
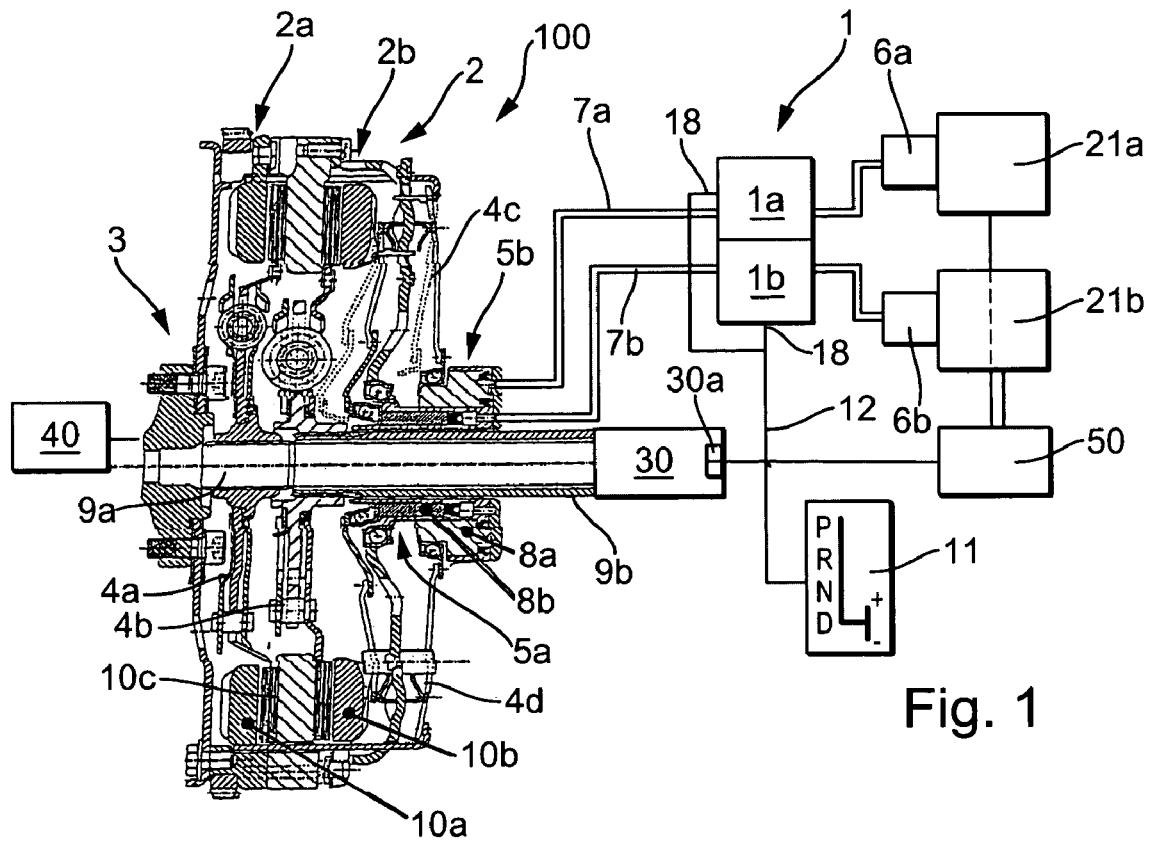
FIG. 1 shows a schematic drivetrain according to the invention.

FIG. 1 shows a schematically represented drivetrain 100 comprising an internal combustion engine 40 and, connected to its output side, a transmission 30 that in this case is a dual clutch 2 having two transmission input shafts 9a, 9b. In the power flow between internal combustion engine 40 and transmission 30, a dual clutch 2 having input part 3, which is joined to the crankshaft of the internal combustion engine in a rotationally fixed manner and, conventionally, in a rigid design as a so-called flex plate—as shown in FIG. 1—may be designed as axially elastic or as a dual-mass flywheel, and being disposed with two output parts 4a, and 4b, each of which is in rotational connection with transmission input shaft 9a and 9b as so-called clutch plates having frictional linings that form frictional engagement with input part 3. For this purpose input part 3 has an axially fixedly mounted pressure plate 10c having frictional engagement surfaces disposed on both sides and is rotationally connected to ring wheel parts 10a, 10b, which are provided for each output part, are axially displaceable, are rotationally connected to input part 3, and each have a frictional engagement surface. By axial displacement of ring wheel parts 10a, 10b, the frictional engagement with the frictional surfaces of output parts 4a, 4b is produced. The annular surfaces in the force-free state are spaced from pressure plate 10c using, for example, leaf springs in such a manner that there is no frictional engagement; that is, both of the output parts are forced-compression clutches.

Clutches 2a, 2b are each engaged with an axial displacement of disengagement levers 4c and 4d. In this context, levers 4c and 4d are held in this state by the particular clutch actuation devices 5a, 5b until a disengagement of the clutch is desired. Each of the two clutches—in a known way—may be provided with a readjustment device, it being possible also for a single common readjustment device to act on both clutches. Of course according to the logic of the invention, other clutch forms and configurations, such as forced-tension clutches, may also be advantageous.

The two friction clutches 2a and 2b are operated by disengagement devices 5a, 5b, each of which comprises master cylinder 6a, 6b, each of which preferably is actuated in a known way via an electric actuator 21a, 21b, a slave cylinder 8a, 8b, which preferably may be ring cylinders disposed concentrically around transmission input shafts 9a, 9b, cylinders distributed around the perimeter surrounding the transmission input shafts or cylinders disposed around a linkage essentially parallel to the transmission input shafts, and a line 7a, 7b connecting slave cylinders 8a, 8b and master cylinders 6a, 6b.

Figure 5:
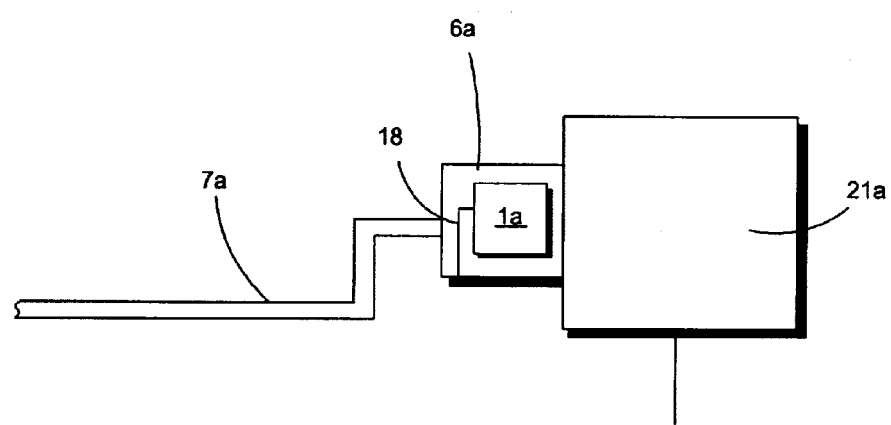
FIG. 5 depicts a pressure relief integrated into a master cylinder of the present invention.

Integrated in line 7a, 7b is pressure relief device 1, which contains within a housing pressure relief devices 1a, 1b for the particular disengagement devices 5a, 5b. Of course the two pressure relief devices 1a, 1b may also be configured separately and may be integrated, for example, in one of the components of the disengagement system, for example in master cylinder 6a, 6b or slave cylinder 8a, 8b as in FIG. 5. Pressure relief device 1 is controlled from outside by, for example, the driver. For this purpose, the driver has at his disposal an actuation device 11, which in the illustrated exemplary embodiment is the selection lever for selecting drive modes of the vehicle having the functions, for example: Park P, Reverse R, Neutral N, Drive D and manual jog control +,−.

The desired operation is transmitted from the actuation device 11 to pressure relief device 1 via an operative connection 12, which may be a Bowden cable or an electrical connecting means, an operative connection in the shown example acting on two fixing devices 18 that prevent a volume equalization and in the case of an actuation enable it.

The mode of operation of drivetrain 100, which is depicted in FIG. 1, proceeds as indicated below.

Transmission control device 50 controls the transmission actuation device, which disengages and engages gears in the transmission according to the driving situation. For this purpose the control device coordinates the actuators, such as electric motors, 21a, 21b, for actuation of clutches 2a, 2b, whereupon drivetrain 100 can be made completely automatic. Alternatively, the driver, by tapping on the selection lever in the position +,− can shift in a power-assisted way using automatic clutch 2. If master cylinders 6a, 6b are in their idle position, that is, clutches 2a, 2b disengage, the pressure in the disengagement devices 5a, 5b is brought up to atmospheric pressure via connections to a compensating tank (not shown). Any pressurization that may be present is reduced. When master cylinders 6a, 6b are operated, the connection to the compensating tank is closed, in line 7a, 7b a pressure is increased and friction clutches 2a, 2b are actuated. If control device 50 fails in a situation of this type, master cylinders 6a, 6b remain in their transitory position, whereupon clutches 2a, 2b remain in frictional engagement according to the position of the lever mechanism 4c, 4d. In order to then produce a decoupling of internal combustion engine 40 and transmission 30, actuation device 11 is activated and thus the pressure relief device actuates so that the pressure built up in lines 7a, 7b is reduced and clutches 2a, 2b are opened. In an especially advantageous manner, various positions of actuation device 11 are used as selection levers to operate the pressure relief device. For example, pressure relief device 1 is always operated in the positions Neutral N and Park P, so the driver is not confronted with the decision to have to operate the actuation device in certain situations. Rather instead volume equalization device 1 is conjointly operated in situations in which the driver would operate the selection lever anyway, for example, when stopping or in unsafe driving situations.

Figure 2:
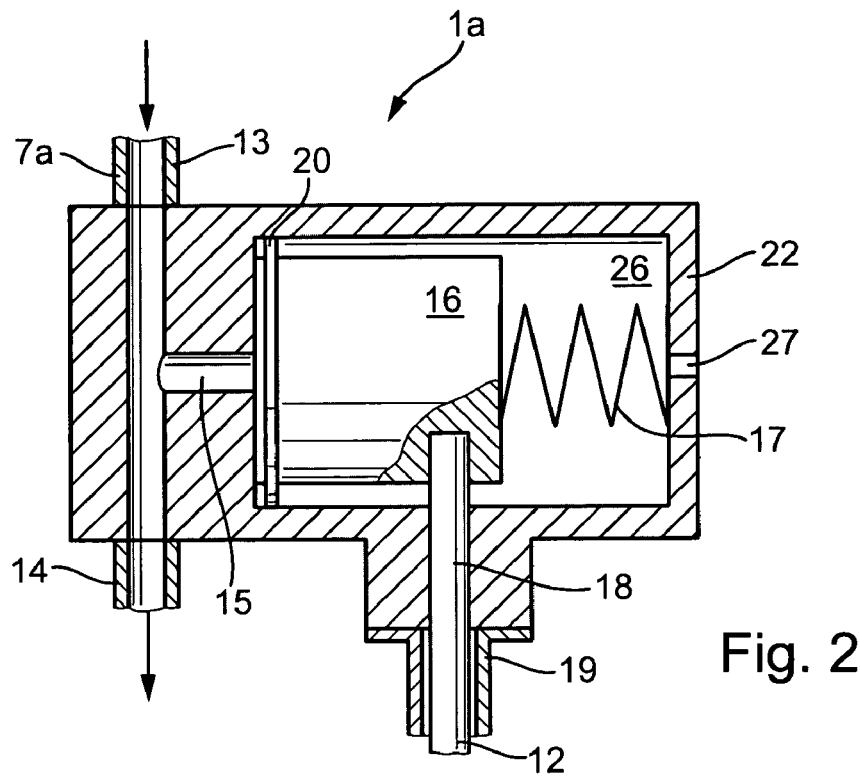
FIGS. 2 to 4 show an exemplary embodiment of a pressure relief device in various operating states.

FIG. 2 shows detail of a pressure relief device 1a for a disengagement device 5a of FIG. 1 with reference to an exemplary embodiment. Housing 22 has one connection 13 from the master cylinder side and one connection 14 to the slave cylinder side and is installed in hydraulic line 7a. Between the two connections 13, 14, a chamber 15 is formed with a specified, ideally minimized dead volume that is limited by a piston 16. Piston 16 is located in another chamber 26 and seals off the two chambers 15, 26 from each other via a sealing means 20, which can be a ring seal like a piston seal or an O-ring. The fixing device 18, which in the shown exemplary embodiment is configured as a pin and is a continuation of Bowden cable 12 that is guided through duct 19, holds piston 16 at its axial position while in a latched state. Duct 19 in this context can have a sealing effect and, moreover, accommodates a sheathing of Bowden cable 12. For the minimization of the dead volume of chamber 15, piston 16 is impinged by a force that is applied by energy storage device 17—represented here as a coil spring. An opening 27 is provided in housing 22 for pressure equalization. Of course the impingement of the piston with a force for minimizing the dead volume of chamber 15 can also be provided using additional or alternative means; for example, opening 27 may be closed or pressurized, whereby energy storage device 17 is dimensioned accordingly or can be eliminated. In a special exemplary embodiment, the opening 27 can be impinged with a pressure that is provided by an actuation device 11 (FIG. 1), for example, via a hydraulic switch with a pressure supply device.

FIG. 2 shows pressure relief device 1a in a fixed state.

Figure 3:
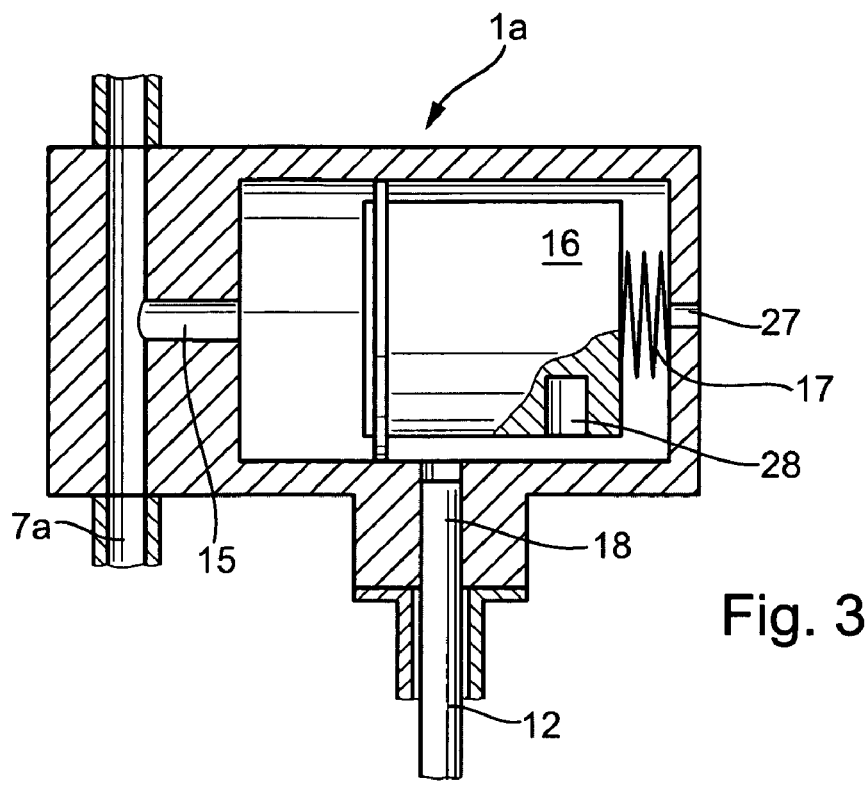

FIG. 3 shows the same pressure relief device 1a in an actuated state with a pulled back Bowden cable 12 and thus a released fixing device 18, which was pulled out of a recess 28 in piston 16 so that, when there is pressure in line 7a due to a compressive force acting on piston 16 that is greater than the spring force of energy storage device 17, piston 16 is displaced and chamber 15 thus receives an increase in volume that causes clutch 2a (FIG. 1) to be disengaged.

Figure 4:
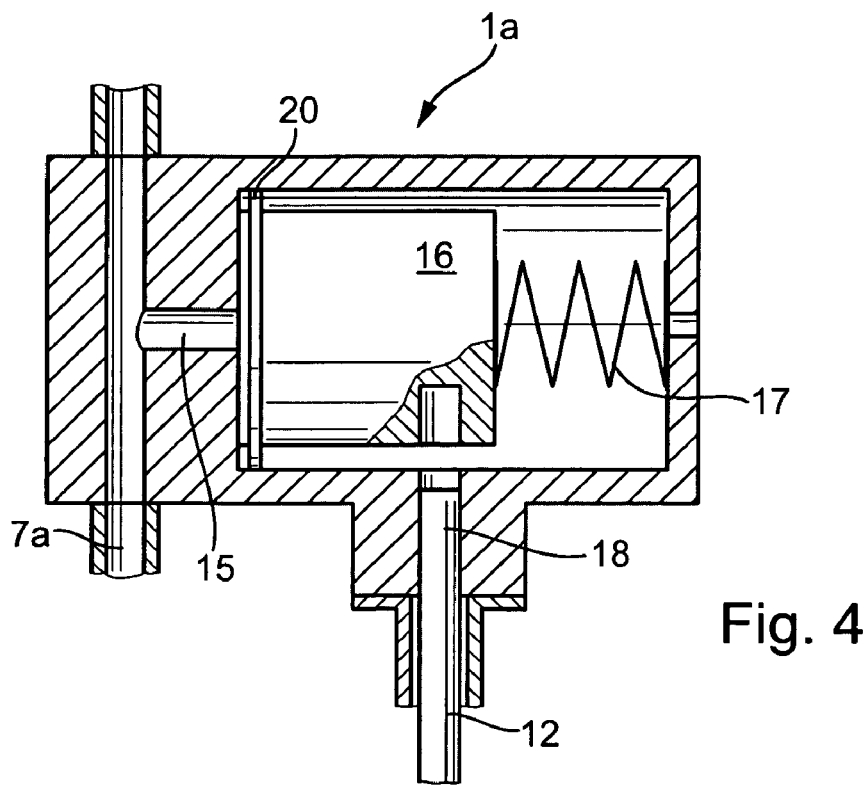

FIG. 4 shows a situation in which line 7a is depressurized, for example when a master cylinder 6a is in an idle position and is connected to the compensating tank. In this case, the fixing device is also triggered by actuation device 11 (FIG. 1) via Bowden cable 12, because, for example, the driver, when control device 50 is operational, has selected the position Park or Neutral. However, nothing changes regarding the position of piston 16 because it is held in its position by energy storage device 17. As a result the volume of chamber 15 remains constant. It should be pointed out that when energy storage device 17 is appropriately designed, especially with the mass of piston 16 and/or the hysteresis of sealing means 20, pressure relief device 1a can simultaneously be used as a so-called "Kribbel" filter (integrated vibration damper) for damping vibrations in line 7a that stem from axial vibrations of the internal combustion engine and are transmitted via the clutch.

The patent claims submitted along with the application are formulation proposals without prejudice for the attainment of ongoing patent protection. The applicant reserves the right to claim additional feature combinations that so far are only disclosed in the description and/or drawings.

References used in the dependent claims point to the further formation of the subject matter of the main claim by the features of each dependent claim; they are not to be understood as renunciation of the attainment of a separate, concrete protection for the feature combinations of the referred dependent claims.

Because the subject matter of the dependent claims may form separate and independent inventions with respect to the state of the art on the priority date, the applicant reserves the right to make them the subject matter of independent claims or separation statements. They may furthermore also include independent inventions that have a configuration independent of the subject matters of prior dependent claims.

The exemplary embodiments are not to be understood as a limitation of the invention. Rather, numerous amendments and modifications are possible within the context of the present publication, especially such variants, elements and combinations and/or materials as may be inferred by one skilled in the art with regard to the resolution of the problem using, for example, a combination or modification of individual features or elements or methodological steps that are described in connection with the general description and embodiments as well as the claims and that are contained in the drawings and, using combinable features, lead to a new subject matter or to new methodological steps or methodological sequences, even if they pertain to manufacturing, testing and operating method.

What is claimed is:

1. A drivetrain comprising a friction clutch for decoupling a transmission from an internal combustion engine having an input part, at least one output part that can be decoupled from the input part and at least one disengagement device, the at least one output part in the force-free state being decoupled from the input part and, by means of the at least one disengagement device, being brought into frictional engagement with the input part, and the at least one disengagement device being formed of a master cylinder and a slave cylinder that is in operative connection with the master cylinder via a hydraulic line, wherein in the hydraulic line between the master cylinder and the slave cylinder is a pressure relief device that sets back a pressure applied between the master cylinder and the slave cylinder when actuated, wherein the pressure relief device is operable by the driver via an actuating device.

2. The drivetrain as described in claim 1, wherein the friction clutch is implemented as a dual clutch having an input part and output parts that are each rotationally connected to a transmission input shaft, in each case a disengagement device actuating an axially displaceable annular part that is rotationally connected to the input part.

3. The drivetrain as described in claim 2, wherein the two disengagement devices are each provided with a pressure relief device.

4. The drivetrain as described in claim 3, wherein the two pressure relief devices are operable via a single actuating device.

5. The drivetrain as described in claim 1, wherein two pressure relief devices for a dual clutch are mounted within one housing.

6. The drivetrain as described in claim 1, wherein at least one pressure relief device is integrated in a master cylinder or slave cylinder.

7. The drivetrain as described in claim 1, wherein the actuating device is a selection lever for selection of the drive mode of the transmission by the driver in operative connection with a pressure relief device.

8. The drivetrain as described in claim 7, wherein the pressure relief device is operated as a function of the position of the selection lever.

9. The drivetrain as described in claim 8, wherein an operation of the pressure relief device occurs at least in the drive mode Neutral (N) and/or Park (P).

10. The drivetrain as described in claim 8, wherein on operation of the pressure relief device does not occur at a selection position Drive (D) or Reverse (R) or in a manual drive mode (+, −).

11. The drivetrain as described in claim 8, wherein the operation of the pressure relief device is delayed for 0.1 to 1 s when there is shifting between the drive modes Drive (D) and Reverse (R) when passing through the selection lever position for Neutral (N).

12. The drivetrain as described in claim 8, wherein operation of the pressure relief device is delayed after selection of the drive mode Neutral (N) by a specified delay time.

13. The drivetrain as described in claim 12, wherein the delay time lies in the range between 0.1 and 1 s.

14. The drivetrain as described in claim 7, wherein the operative connection is a Bowden cable connected to the actuation device.

15. The drivetrain as described in claim 7, wherein the operative connection is an electrical operative connection.

16. The drivetrain as described in claim 15, wherein the operative connection acts on an electrically actuated valve that is in connection with a switch provided on the actuation device.

17. The drivetrain as described in claim 15, wherein the electrical operative connection is in connection with an electrical valve that directly forms the pressure relief device.

18. The drivetrain as described in claim 15, wherein the electrical operative connection actuates the pressure relief device in the de-energized state.

19. The drivetrain as described in claim 7, wherein the operative connection is an actuated pin that is connected to an electrically operated switch that is connected to the actuation device.

20. The drivetrain as described in claim 1, wherein the pressure relief device has an input-side feed and an output-side discharge and between them a chamber is provided with a dead volume that is expandable via an axially displaceable piston that is sealed off from the chamber against the action of an energy storage device if the force on the piston due to the pressure in the pressure line is greater than the axial force of the energy storage device acting on the piston, and the piston with regard to its axial displacement is released from the operative connection.

* * * * *